United States Patent
Li (10) Patent No.: US 10,042,099 B2
(45) Date of Patent: Aug. 7, 2018

(54) WIRE GRID POLARIZER AND MANUFACTURING METHOD THEREOF, AND DISPLAY DEVICE

(71) Applicant: BOE TECHNOLOGY GROUP CO., LTD., Beijing (CN)

(72) Inventor: Yingyi Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/893,703

(22) PCT Filed: May 7, 2015

(86) PCT No.: PCT/CN2015/078474
§ 371 (c)(1),
(2) Date: Nov. 24, 2015

(87) PCT Pub. No.: WO2016/107040
PCT Pub. Date: Jul. 7, 2016

(65) Prior Publication Data
US 2016/0341861 A1    Nov. 24, 2016

(30) Foreign Application Priority Data
Dec. 30, 2014   (CN) .......................... 2014 1 0841901

(51) Int. Cl.
*G02B 5/30*   (2006.01)
*B29D 11/00*   (2006.01)
(Continued)

(52) U.S. Cl.
CPC ...... *G02B 5/3058* (2013.01); *B29D 11/00644* (2013.01); *B29K 2033/04* (2013.01); *B29K 2105/0002* (2013.01)

(58) Field of Classification Search
CPC ...... G02B 5/30; G02B 5/3025; G02B 5/3058; G02B 5/3066; G02B 5/3075
(Continued)

(56) References Cited

U.S. PATENT DOCUMENTS 7,605,883 B2   10/2009   Yamaki et al.
7,692,860 B2    4/2010   Sato et al.
(Continued)

FOREIGN PATENT DOCUMENTS

CN     1737615 A    2/2006
CN     1952700 A    4/2007
(Continued)

OTHER PUBLICATIONS

International Search Report of PCT/CN2015/078480 in Chinese, dated Sep. 7, 2015 with English translation.
(Continued)

*Primary Examiner* — Robert E Tallman
(74) *Attorney, Agent, or Firm* — Collard & Roe, P.C.

(57) ABSTRACT

Disclosed are a wire grid polarizer and a manufacturing method thereof, and a display device, which relate to the display technical field. The problem of high production cost in a manufacture process of a wire grid polarizer can be solved. The manufacturing method of the wire grid polarizer includes: coating a first polymer monomer on the surface of the base substrate; subjecting the first polymer monomer corresponding to the first preset position to a curing treatment; forming a pattern of first protrusions with intervals on the surface of the base substrate; coating a mixture of the second polymer monomer and metal particles on the surface of the substrate provided with the first protrusions; subjecting the mixture corresponding to the second preset position to a curing treatment; forming a pattern of wire grid formed of the second protrusions with intervals on the surface of the (Continued)

base substrate; wherein each second protrusion covers at least one surface for polarization of one first protrusion.

20 Claims, 7 Drawing Sheets

(51) Int. Cl.
    *B29K 33/04*         (2006.01)
    *B29K 105/00*      (2006.01)

(58) Field of Classification Search
    USPC .................. 359/485.01, 485.03, 485.05
    See application file for complete search history.

(56) References Cited

U.S. PATENT DOCUMENTS

| | | | |
|---|---|---|---|
| 8,623,161 | B2 * | 1/2014 | Kaida .................. G02B 5/3058 156/246 |
| 8,693,094 | B2 | 4/2014 | Louh |
| 8,730,575 | B2 | 5/2014 | Kaida et al. |
| 8,896,920 | B2 | 11/2014 | Jung et al. |
| 8,902,380 | B2 | 12/2014 | Lu |
| RE45,642 | E | 8/2015 | Takada |
| 2006/0279842 | A1 | 12/2006 | Kim et al. |
| 2007/0159577 | A1 | 7/2007 | Atsushi et al. |
| 2007/0242187 | A1 | 10/2007 | Yamaki et al. |
| 2008/0118660 | A1 | 5/2008 | Choi et al. |
| 2008/0129931 | A1 * | 6/2008 | Takahashi ............ G02B 5/3058 349/96 |
| 2008/0186576 | A1 | 8/2008 | Takada |
| 2008/0303986 | A1 | 12/2008 | Yamaki et al. |
| 2009/0027773 | A1 | 1/2009 | Kawakami |
| 2009/0052030 | A1 | 2/2009 | Kaida et al. |
| 2009/0067047 | A1 | 3/2009 | Ueda et al. |
| 2010/0007827 | A1 | 1/2010 | Nishimura et al. |
| 2010/0196617 | A1 | 8/2010 | Done et al. |
| 2011/0080640 | A1 * | 4/2011 | Kaida .................. G02B 5/3058 359/485.05 |
| 2011/0096396 | A1 | 4/2011 | Kaida et al. |
| 2011/0128623 | A1 | 6/2011 | Louh |
| 2011/0181813 | A1 | 7/2011 | Kim et al. |
| 2012/0164317 | A1 | 6/2012 | Kim et al. |
| 2012/0236410 | A1 | 9/2012 | Akita et al. |
| 2013/0033659 | A1 | 2/2013 | Chung et al. |
| 2013/0040052 | A1 | 2/2013 | Akita et al. |
| 2013/0088663 | A1 | 4/2013 | Jang et al. |
| 2013/0126468 | A1 | 5/2013 | Kim et al. |
| 2014/0036200 | A1 | 2/2014 | Jung et al. |
| 2014/0211316 | A1 | 7/2014 | Furui et al. |
| 2014/0216783 | A1 | 8/2014 | Trauernicht et al. |
| 2014/0293142 | A1 | 10/2014 | Kawazu et al. |
| 2015/0227230 | A1 | 8/2015 | Cok et al. |
| 2016/0341861 | A1 | 11/2016 | Li |
| 2017/0205551 | A1 | 7/2017 | Li et al. |

FOREIGN PATENT DOCUMENTS

| | | |
|---|---|---|
| CN | 101116018 A | 1/2008 |
| CN | 101354458 A | 1/2009 |
| CN | 101416083 A | 4/2009 |
| CN | 101419298 A | 4/2009 |
| CN | 101548206 A | 9/2009 |
| CN | 101900841 A | 12/2010 |
| CN | 101981479 A | 2/2011 |
| CN | 102087377 A | 6/2011 |
| CN | 102096134 A | 6/2011 |
| CN | 102308234 A | 1/2012 |
| CN | 102540306 A | 7/2012 |
| CN | 102576107 A | 7/2012 |
| CN | 202433543 U | 9/2012 |
| CN | 102713697 A | 10/2012 |
| CN | 102914901 A | 2/2013 |
| CN | 103998956 A | 8/2014 |
| CN | 104297835 A | 1/2015 |
| CN | 104459865 A | 3/2015 |
| CN | 104483733 A | 4/2015 |
| EP | 1 775 607 A1 | 4/2007 |
| EP | 2 023 169 A1 | 2/2009 |
| JP | 2006-184624 A | 7/2006 |
| JP | 2007-017641 A | 1/2007 |
| JP | 2007-121507 A | 5/2007 |
| JP | 2008-145581 A | 6/2008 |
| JP | 2009-157071 A | 7/2009 |
| JP | 2010-266483 A | 11/2010 |
| JP | 2011-221412 A | 11/2011 |
| JP | 2012-168301 A | 9/2012 |
| KR | 10-2008-0057063 A | 6/2008 |
| KR | 10-2010-0035347 A | 4/2010 |
| WO | 2007/116972 A1 | 10/2007 |
| WO | 2010/126110 A1 | 11/2010 |

OTHER PUBLICATIONS

Notice of Transmittal of the International Search Report of PCT/CN2015/078480 in Chinese, dated Sep. 7, 2015.
Written Opinion of the International Searching Authority of PCT/CN2015/078480 in Chinese, dated Sep. 7, 2015 with English translation.
Chinese Office Action in Chinese Application No. 201410843630.5, dated May 3, 2016 with English translation.
Second Chinese Office Action in Chinese Application No. 201410843630.5, dated Oct. 18, 2016 with English translation.
Second Chinese Office Action in Chinese Application No. 201410841901.3, dated Nov. 28, 2016 with English translation.
Office Action in U.S. Appl. No. 14/890,782, dated Dec. 13, 2016.
Third Chinese Office Action in Chinese Application No. 201410843630.5, dated Jan. 18, 2017 with English ranslation.
Final Office Action in U.S. Appl. No. 14/890,782 dated May 23, 2017.
International Search Report of PCT/CN2015/073641 in Chinese, dated May 29, 2015 with English translation.
Notice of Transmittal of the International Search Report of PCT/CN2015/073641 in Chinese, dated May 29, 2015.
Written Opinion of the International Searching Authority of PCT/CN2015/073641 in Chinese, dated May 29, 2015 with English translation.
International Preliminary Report on Patentability and Written Opinion of the International Searching Authority of PCT/CN2015/073641, dated Apr. 18, 2017.
First Chinese Office Action in Chinese Application No. 201410554865.2, dated Feb. 3, 2016 with English translation.
Second Chinese Office Action in Chinese Application No. 201410554865.2, dated Jul. 12, 2016 with English translation.
Non-Final Office Action in U.S. Appl. No. 151324,392, dated May 31, 2017.
International Search Report of PCT/CN2015/078474 in Chinese, dated Sep. 29, 2015 with English translation.
Notice of Transmittal of the International Search Report of PCT/CN2015/078474 in Chinese, dated Sep. 29, 2015.
Written Opinion of the International Searching Authority of PCT/CN2015/078474 in Chinese, dated Sep. 29, 2015 with English translation.
Chinese Office Action in Chinese Application No. 201410841901.3 dated May 19, 2016 with English translation.
Non-Final Office Action in U.S. Appl. No. 14/890,782 dated Sep. 6, 2017.
Final Office Action in U.S. Appl. No. 14/890,782 dated Dec. 13, 2017.
Supplementary European Search Report in EP 15850352.4 dated May 23, 2018.

* cited by examiner

Prior Art

Fig. 1a

Prior Art

WIRE GRID POLARIZER AND MANUFACTURING METHOD THEREOF, AND DISPLAY DEVICE

CROSS REFERENCE TO RELATED APPLICATIONS

This application is the National Stage of PCT/CN2015/078474 filed on May 7, 2015, which claims priority under 35 U.S.C. § 119 of Chinese Application No. 201410841901.3 filed on Dec. 30, 2014, the disclosure of which is incorporated by reference.

TECHNICAL FIELD

The present invention relates to a wire grid polarizer and a manufacturing method thereof, and a display device comprising the wire grid polarizer.

BACKGROUND

As a flat display device, TFT-LCD (Thin Film Transistor Liquid Crystal Display) is applied in the field of high performance display increasingly because of its characteristics including small size, low power consumption, no irradiation, relatively low fabrication cost, etc.

Figure 1A:
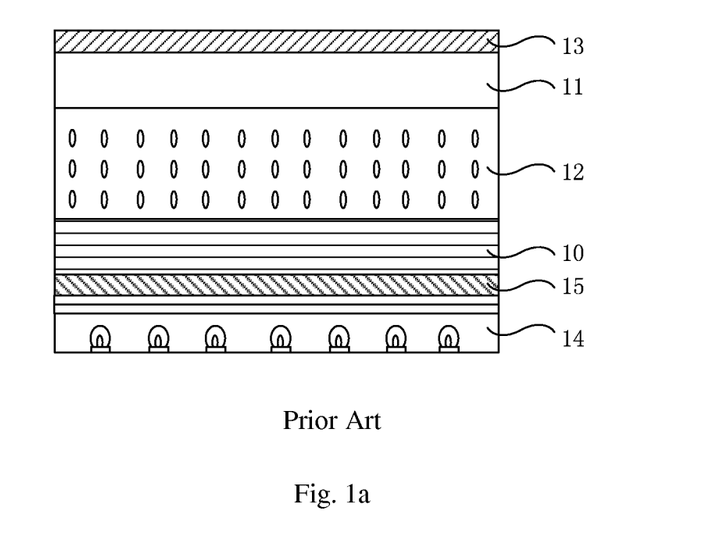
FIG. 1a is a schematic structural view of a display device provide by prior art.

As shown in FIG. 1a, a TFT-LCD comprises an array substrate 10 and a color filter substrate 11. A liquid crystal layer 12 is disposed between the array substrate 10 and the color filter substrate 11. Furthermore, a first polarizer 13 is disposed on an upper surface of the color filter substrate 11, and a second polarizer 15 is disposed between the array substrate 10 and a backlight module 14. In some embodiments, the first polarizer 13 is perpendicular to an optic axis of the second polarizer 15. If no electric field is applied to the liquid crystal layer 12, light emitted from the backlight module 14 will enter the liquid crystal layer 12 through the second polarizer 15, and liquid crystal molecules will rotate the direction of the incident light, such that the light will be emitted from the first polarizer 13. If an electric field is applied to the liquid crystal layer, the arrangement direction of liquid crystal molecules in the liquid crystal layer 12 will be changed, such that the incident light cannot penetrate it. As such, light intensity can be controlled accordingly, and a color image can be displayed by virtue of light filtration effects of the color filter substrate 11.

In prior art, said polarizer (the first polarizer 13 and the second polarizer 15) can be formed with a polyvinyl alcohol (PVA) thin film. One polarized component of natural light will penetrate and the other polarized component will be absorbed by the polarizer. As such, it may cause a significant loss of light, and thus significantly decrease light utilization efficiency.

Figure 1B:
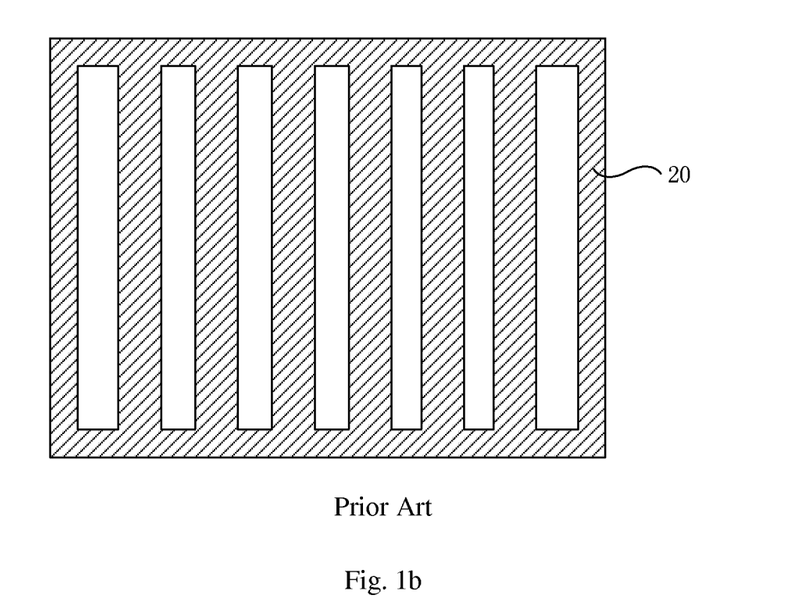
FIG. 1b is a schematic structural view of a wire grid polarizer provided by prior art.

In order to solve the above problems, in prior art, there provides a wire grid polarizer 20 formed of a metal material, as shown in FIG. 1b. When light enters the wire grid polarizer 20, with the oscillation effect of free electrons on a surface of the metal, light oscillating parallel to an electric field vector component of the wire grid is almost all reflected, whereas almost all light oscillating perpendicular to the electric field vector component of the wire grid penetrates. Furthermore, the light reflected by the wire grid polarizer 20 can be reused, such that the utilization efficiency of light is improved effectively.

However, in prior art, during the process for manufacturing the above wire grid polarizer 20, a metal target material is required, which should be subjected to an evaporation magnetron sputtering process to form a metal thin film on a substrate, and thus there is a significant consumption of the target material. Therefore, fabrication cost is high in prior art.

SUMMARY

The present invention provides a wire grid polarizer, a manufacturing method thereof, and a display device. The problem of high production cost in a manufacture process of a wire grid polarizer can be solved.

In order to achieve the above objectives, embodiments of the present invention adopt the following technical solutions.

In an aspect of an embodiment of the present invention, there provides a wire grid polarizer, comprising: a base substrate; first protrusions disposed on a surface of the base substrate with intervals being provided between the first protrusions, the first protrusions being formed of a first resin material; second protrusions disposed on the surface of the base substrate with intervals being provided between the second protrusions, the second protrusions being formed of a second resin material doped with metal particles and forming a pattern of wire grid; wherein each of the second protrusions covers at least one surface for polarization of the first protrusions, and the surface for polarization is at least one of an upper surface and a side surface of the first protrusions, and the side surface is parallel to an arrangement direction of the wire grid.

In some embodiments, each of the second protrusions covers at least one surface for polarization of one of the first protrusions.

In another aspect of an embodiment of the present invention, there provides a manufacturing method of the wire grid polarizer, comprising: coating a first polymer monomer on the surface of the base substrate; subjecting the first polymer monomer corresponding to a preset position (that is, corresponding to the first protrusions) to a curing treatment; forming a pattern of the first protrusions the surface of the base substrate with intervals on being provided between the first protrusions; coating a mixture of a second polymer monomer and metal particles on the surface of the substrate provided with the first protrusions; subjecting the mixture at a position corresponding to a second preset position (that is, corresponding to the second protrusions) to a curing treatment; and forming a pattern of wire grid formed of the second protrusions on the surface of the base substrate with intervals being provided between the second protrusions; wherein each of the second protrusions covers at least one surface for polarization of the first protrusions, and the surface for polarization is at least one of an upper surface and a side surface of the first protrusions, and the side surface is parallel to an arrangement direction of the wire grid.

In another aspect of an embodiment of the present invention, there provides a wire grid polarizer, comprising: a base substrate; first protrusions disposed on a surface of the base substrate with intervals being provided between the first protrusions, the first protrusions being formed of a first resin material; second protrusions disposed on the surface of the base substrate with intervals being provided between the second protrusions, the second protrusions being formed of a second resin material doped with metal particles; wherein each of the second protrusions covers at least one surface for polarization of the first protrusions, and the surface for polarization is at least one of an upper surface and a side surface of the first protrusions, and the side surface is parallel to an arrangement direction of the wire grid. In some embodiments, each of the second protrusions covers at least one surface for polarization of one first protrusion.

In another aspect of an embodiment of the present invention, there provides a display device comprising any one of the above wire grid polarizer.

An embodiment of the present invention provides a wire grid polarizer and a manufacturing method thereof, and a display device. In some embodiments, the manufacturing method of the wire grid polarizer comprises: firstly, coating a first polymer monomer on the surface of a base substrate; and then, subjecting the first polymer monomer at a position corresponding to a first preset position (that is, corresponding to the first protrusions) to a curing treatment. An uncured first polymer monomer at a position except the first preset position can be removed before or after this step, such that a pattern of the first protrusions with intervals being provided therebetween can be formed on the surface of the base substrate. Then, a mixture of a second polymer monomer and metal particles is coated on the surface of the substrate provided with the first protrusion, and the mixture corresponding to a second preset position is subjected to a curing treatment. An uncured mixture at a position except the second preset position (that is, the second protrusion) can be removed before or after this step, such that a pattern of wire grid formed of the second protrusions can be formed on the surface of the base substrate with intervals being provided between the second protrusions. In some embodiments, each of the second protrusions covers at least one surface for polarization of the first protrusions. In some embodiments, each second protrusion covers at least one surface for polarization of one first protrusion. Under the circumstances, in one aspect, due to the metal particles in the second protrusions, an incident light can be polarized by virtue of oscillation properties of free electrons in the metal particles, such that a wire grid polarizer with reflection properties can be formed. In another aspect, since the first polymer monomer and the second polymer monomer are generally resin materials, the consumption of metal materials can be reduced during the manufacturing of the wire grid polarizer, and the production cost can be reduced because the cost of a resin material is relatively low in comparison with a metal target material.

BRIEF DESCRIPTION OF THE DRAWINGS

Simple description will be given below to the accompanying drawings of the embodiments to provide a clearer illustration of the technical solutions of the embodiments of the present invention. Obviously, the drawings described below only involve some embodiments of the present invention but are not intended to limit the present invention.

DETAILED DESCRIPTION

For clearer understanding of the objectives, technical solutions and advantages of the embodiments of the present invention, clear and complete description will be given below to the technical solutions of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Figure 2:
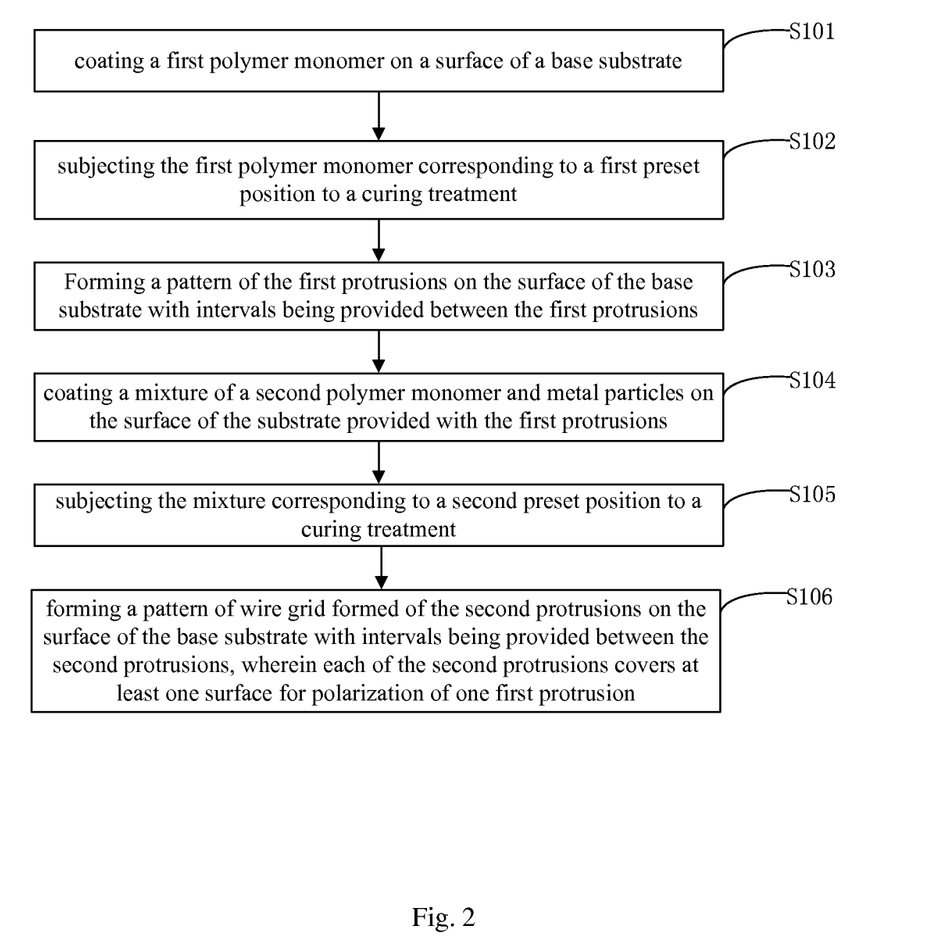
FIG. 2 is a flowchart of a manufacturing method of a wire grid polarizer provided by an embodiment of the present invention.

An embodiment of the present invention provides a manufacturing method of a wire grid polarizer, which may comprises the following steps S101 to S106 as shown in FIG. 2.

Figure 4A:
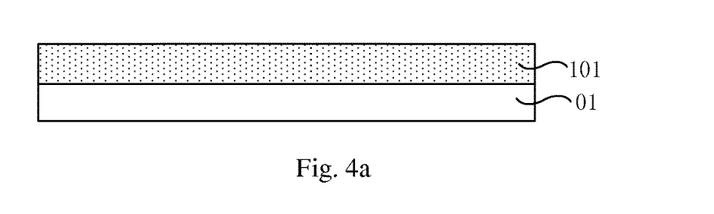
FIG. 4a to FIG. 4f are a schematic structural view of each process of a manufacturing method of a wire grid polarizer provided by an embodiment of the present invention.

S101: coating a first polymer monomer 101 on a surface of a base substrate 01, as shown in FIG. 4a.

In some embodiments, a material for forming the base substrate 01 may comprises at least one of glass and quartz. If the wire grid polarizer is intended to be applied in a flexible display device, the material for forming the base substrate 01 can comprise at least one of polyethylene glycol terephthalate (PET) and cellulose triacetate (TAC), in order to satisfy the requirements of bending and rolling for design of the flexible display device.

S102: subjecting the first polymer monomer 101 corresponding to a first preset position (that is, corresponding to the first protrusion) to a curing treatment.

S103: forming a pattern of the first protrusions 110 on the surface of the base substrate 01 with intervals being provided between the first protrusions.

S104: coating a mixture 100 of a second polymer monomer 102 and metal particles 103 on the surface of the substrate provided with the first protrusion 110

S105: subjecting the mixture 100 corresponding to a second preset position (that is, corresponding to the second protrusion) to a curing treatment.

S106: forming a pattern of wire grid formed of the second protrusion 111 with intervals on the surface of the base substrate.

Figure 4B:
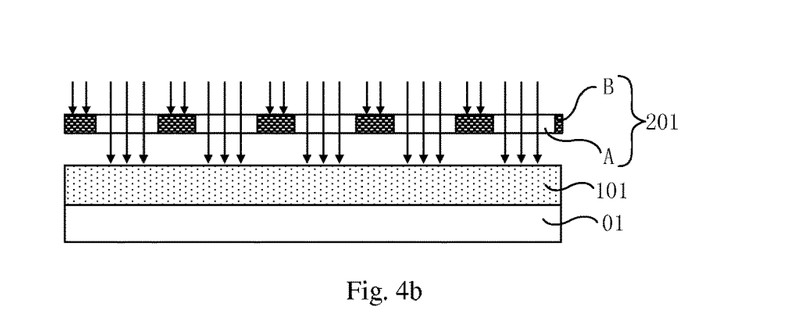
Figure 4C:
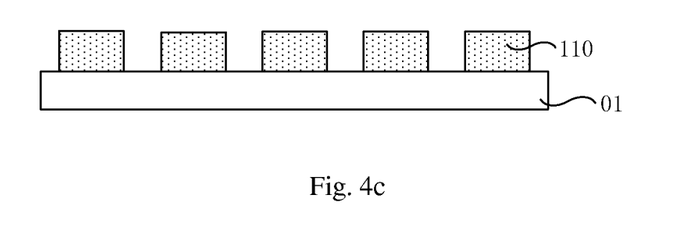
Figure 4D:
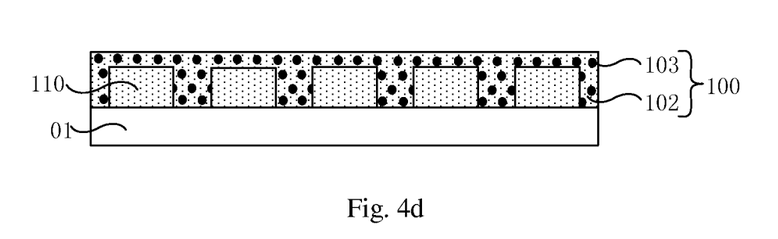
Figure 4E:
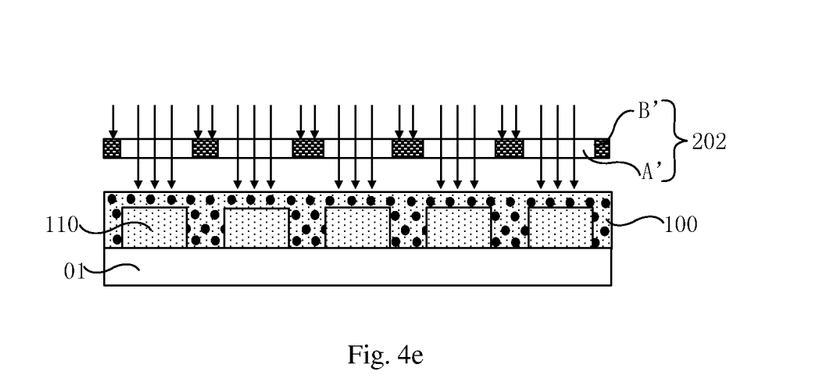
Figure 4F:
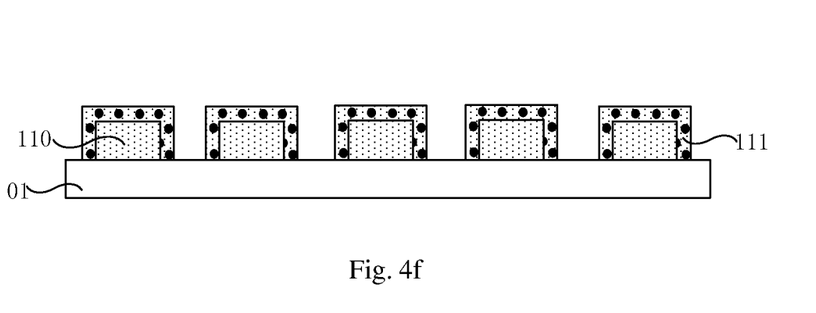
Figure 4G:
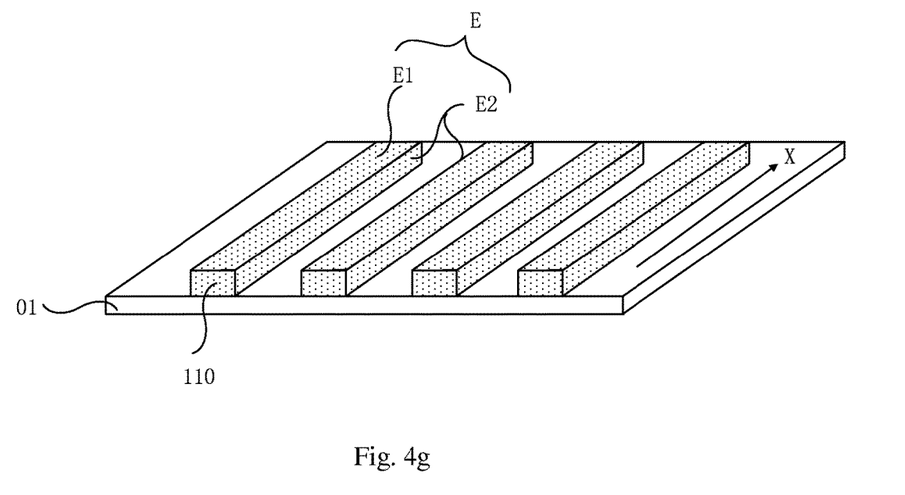
FIG. 4g is a 3-dimensional schematic structural view of first protrusions provided by an embodiment of the present invention.

In some embodiments, each of the second protrusions 111 covers at least one surface for polarization E of the first protrusions 110. In some embodiments, each of the second protrusions 111 covers at least one surface for polarization E of one first protrusion 110. As shown in FIG. 4g, the surface for polarization E can be either an upper surface E1 or a side surface E2 of the first protrusions 110, and the side surface E2 is parallel to an arrangement direction X of the wire grid (in other words, along the arrangement direction X of the wire grid).

An embodiment of the present invention provides a manufacturing method of the wire grid polarizer, comprising: firstly, coating a first polymer monomer on a surface of a base substrate; and then, subjecting the first polymer monomer corresponding to a first preset position (that is, corresponding to the first protrusions) to a curing treatment. An uncured first polymer monomer at a position except the first preset position (that is, except the position corresponding to the first protrusions) can be removed before or after this step, such that a pattern of the first protrusions with intervals being provided between the first protrusions can be formed on the surface of the base substrate. Then, coating a mixture of a second polymer monomer and metal particles on the surface of the substrate provided with the first protrusions, and subjecting the mixture corresponding to a second preset position (that is, corresponding to the second protrusions) to a curing treatment. An uncured mixture at a position except the second preset position (that is, except the second protrusions) can be removed before or after this step, such that a pattern of wire grid formed of the second protrusions with intervals being provided between the second protrusions can be formed on the surface of the base substrate. In some embodiments, each of the second protrusions covers at least one surface for polarization of the first protrusions. In some embodiments, each of the second protrusions covers at least one surface for polarization of one first protrusion. Under the circumstances, in one aspect, due to the metal particles in the second protrusions, an incident light can be polarized by virtue of oscillation properties of free electrons in the metal particles, such that a wire grid polarizer with reflection properties can be formed. In another aspect, since the first polymer monomer and the second polymer monomer are generally resin materials, the consumption of metal materials can be reduced in the manufacturing of the wire grid polarizer, and the production cost can be reduced because the cost of a resin material is relatively low in comparison with a metal target material.

It should be noted that: firstly, a material for forming the first polymer monomer 101 or the second polymer monomer 102 may comprises an acrylic monomer, such as at least one selected from the group consisting of methyl acrylate, ethyl acrylate, n-butyl acrylate, methyl methacrylate and n-butyl methacrylate.

Secondly, the curing treatment in the embodiments of the present invention means subjecting the material of the first polymer monomer 101 or the second polymer monomer 102 to a chemical reaction, with the aid of heating, pressuring, a curing agent or UV light, such that a chemical bond is formed among their linear molecules, and connects the linear molecules together to form a network structure and finally form an insoluble and infusible substance by a crosslinking curing process. If the first polymer monomer 101 or the second polymer monomer 102 formed from an acrylic monomer is subjected to the above curing treatment, an acrylic polymer can be formed. The following embodiments of the present invention are illustrated by using a UV light irradiation process as the curing treatment process.

Thirdly, the above metal particles 103 mean metal particles with nanometer size, and can be formed of one or more selected from the group consisting of elementary substance iron, elementary substance copper and elementary substance aluminum. Metal aluminum contains more free electrons because it has greater conductivity. Whereas, the polarization of an incident light by a wire grid polarizer in the present invention is just achieved by use of oscillation properties of free electrons in a metal. Therefore, a preferred metal particles 103 in an embodiment of the present invention is aluminum particles or aluminum alloy particles.

Fourthly, a wire grid polarizer 20 having a wire grid pattern is required to have a polarization effect for an incident light. Under the circumstances, it is required that the second protrusions 111 constituting the pattern of wire grid are arranged at a period T (an distance between the centers of two adjacent second protrusion 111) of less than or equal to half of the wavelength of an incident light.

Furthermore, the second preset position is a position corresponding to the second protrusions 111. In some embodiments, the position of the second protrusions 111 relates to the incident light. Therefore, the second preset position can be set according to different incident light. For example, if an incident light is visible light, the period T of the second protrusions 111 can be less than or equal to 200 nm, because the wavelength of a visible light is 400-800 nm. Therefore, the second preset position can be set according to a period T (the distance between the centers of two adjacent second protrusions 111) of ≤200 nm. Also, for example, when the wire grid polarizer is applied to an IR camera, the period T of the second protrusions 111 can be less than or equal to 380 nm, because the wavelength of IR light, as the incident light, is 760 nm-1 mm. Therefore, the second protrusions 111 and the second preset positions corresponding to the same can be set according to a period T of ≤380 nm.

As long as a wire grid polarizer can be used normally, the period T of the second protrusions 111 is preferred to be as small as possible. However, with the decreasing of the period T of the second protrusions 111, an increased manufacturing precision is required, and the difficulty in processing is increased. Therefore, a preferred period T of the second protrusions 111 in the present invention is less than or equal to 100 nm by taking both the difficulty in processing and the polarization effect into consideration.

A manufacturing method of the wire grid polarizer will be described in detail by the following specific embodiments.

Example 1

Figure 3:
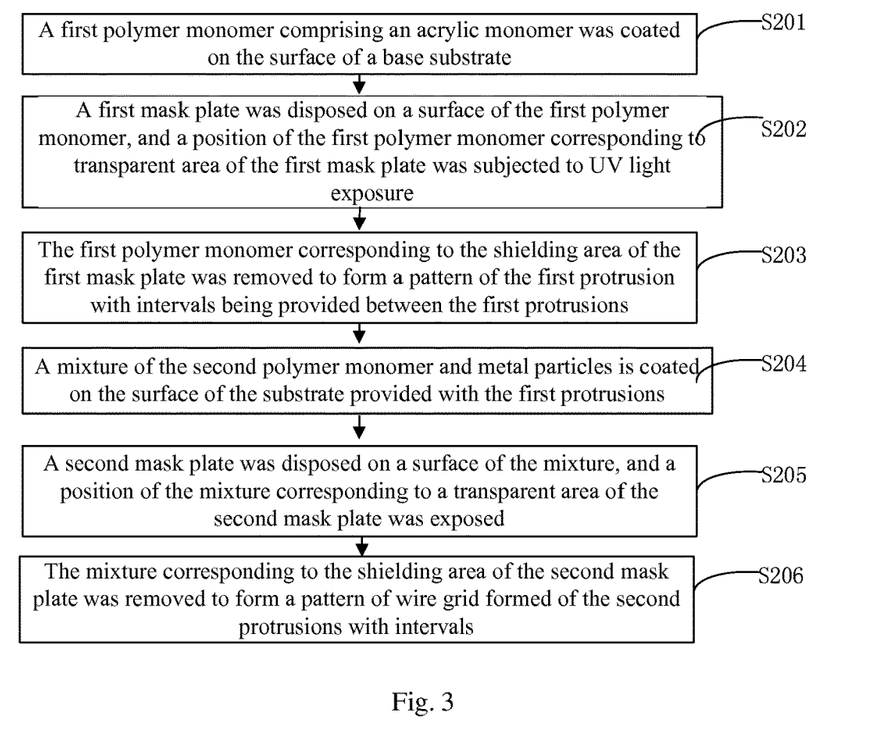
FIG. 3 is a flowchart of a manufacturing method of another wire grid polarizer provided by an embodiment of the present invention.

S201: A first polymer monomer 101 comprising an acrylic monomer was coated on the surface of a base substrate 01, as shown in FIG. 3 and FIG. 4a.

S202: A first mask plate 201 was disposed on a surface of the first polymer monomer 101, and a position of the first polymer monomer 101 corresponding to a transparent area A of the first mask plate 201 was subjected to UV light exposure, as shown in FIG. 4b.

In some embodiments, the first mask plate 201 also comprises an opaque shielding area B, such that with shielding by the shielding area B, a first polymer monomer 101 at the position corresponding to the shielding area B will not be irradiated by UV light and thus will not be cured.

S203: The first polymer monomer 101 corresponding to the shielding area B of the first mask plate 201 was removed to form a pattern of the first protrusion 110 with intervals being provided between the first protrusions, as shown in FIG. 4c.

In some embodiments, because the first polymer monomer 101 corresponding to the shielding area B of the first mask plate 201 is not cured and is flowable, the substrate after being subjected to step S202 can be washed with a solvent capable of dissolving the polymer monomer.

S204: A mixture 100 of the second polymer monomer 102 and metal particles 103 is coated on the surface of the substrate provided with the first protrusions 110, as shown in FIG. 4d.

In some embodiments, a sum of the thickness of the first polymer monomer 101 formed on a surface of the base substrate 01 in step S101 or step S201 and the thickness of the second polymer monomer 102 formed in step S204 can be 20 nm-100 nm, including the end points of 20 nm and 100 nm. In one aspect, if a sum of the thickness of the first polymer monomer 101 and the thickness of the second polymer monomer 102 is less than 20 nm, a segment difference (height difference) between the formed second protrusions 111 and base substrate 01 will be too small, such that the obtained wire grid polarizer cannot polarize an incident light. In another aspect, if a sum of thickness of the first polymer monomer 101 and thickness of the second polymer monomer 102 is greater than 100 nm, the thickness of the wire grid polarizer will be too thick, such that a display device thus manufactured will not meet the trend of ultrathining.

In some embodiments, as long as the above thickness is achieved and the formed wire grid polarizer can polarize an incident light, the thickness of the first polymer monomer 101 can be increased as much as possible to reduce the manufacture cost.

S205: A second mask plate 202 was disposed on a surface of the mixture 100, and a position of the mixture 100 corresponding to a transparent area A' of the second mask plate 202 was exposed, as shown in FIG. 4e.

In some embodiments, the second mask plate 202 also comprises an opaque shielding area B', such that a mixture 100 at the position corresponding to the shielding area B' will not be irradiated by UV light and thus will not be cured, with shielding by the shielding area B'.

It should be noted that, a transparent area A' of the second mask plate 202 corresponds to the transparent area A of the first mask plate 201, and the shielding area B' of the second mask plate 202 corresponds to the shielding area B of the first mask plate 201. Preferably, a width of the transparent area A' of the second mask plate 202 can be less than or equal to 50 nm, such that a width of the formed second protrusion 111 is less than or equal to 50 nm, such that the finally produced wire grid polarizer has better polarization effect. In addition, in order to ensure that the formed second protrusion 111 can cover the first protrusion 110, a width of the transparent area A of the first mask plate 201 should less than a width of the transparent area A' of the second mask plate 202.

S206: The mixture 100 corresponding to the shielding area B of the second mask plate 202 was removed to form a pattern of wire grid formed of the second protrusions 111 with intervals being provided between the second protrusions, as shown in FIG. 4f. Specifically, since the mixture 100 corresponding to the shielding area B' of the second mask plate 202 is not cured and is flowable, the substrate can be washed with a solvent capable of dissolving the polymer monomer in step S206, in order to remove the mixture 100 unexposed to light.

Example 2

Figure 5:
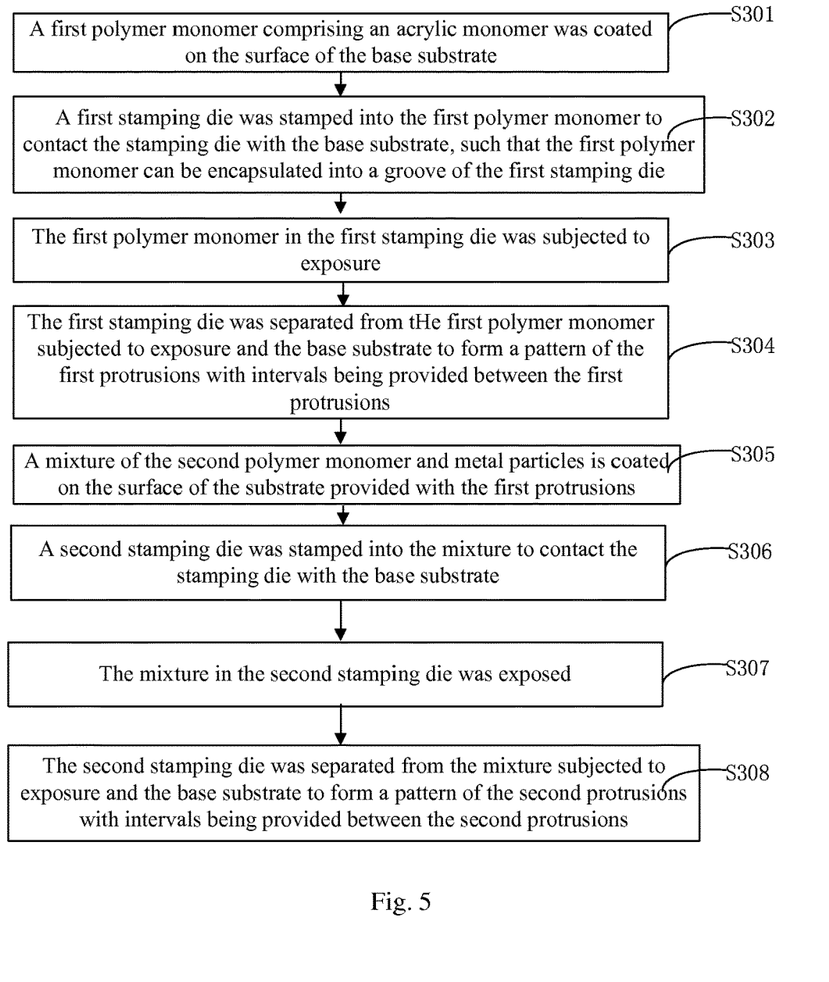
FIG. 5 is a flowchart of a manufacturing method of another wire grid polarizer provided by an embodiment of the present invention.

S301: A first polymer monomer 101 comprising an acrylic monomer was coated on the surface of the base substrate 01, as shown in FIG. 5.

S302: A first stamping die 203 was stamped into the first polymer monomer 101 to contact the stamping die with the base substrate 01, such that the first polymer monomer 101 can be encapsulated into a groove of the first stamping die 203.

S303: The first polymer monomer 101 in the first stamping die 203 was exposed.

Figure 6:
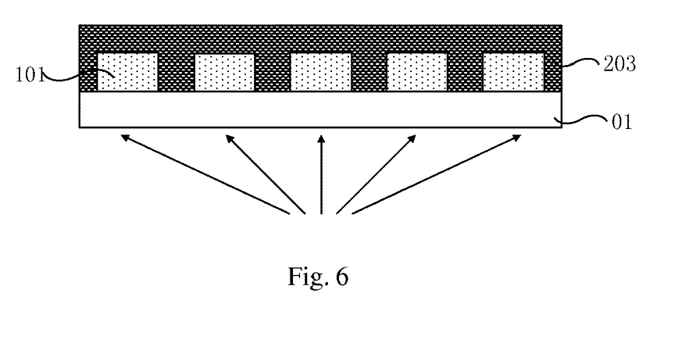
FIG. 6 is a schematic structural view of a process of another manufacturing method of a wire grid polarizer provided by an embodiment of the present invention.

In some embodiments, if the first stamping die 203 is formed of an opaque material, the first polymer monomer 101 in the first stamping die 203 can be exposed from the side of the base substrate 01 facing away from the first stamping die 203, as shown in FIG. 6.

In some embodiments, the first stamping die 203 is preferably formed of a transparent material, such that not only the first polymer monomer 101 in the first stamping die 203 can be exposed from the side of the base substrate 01 facing away from the first stamping die 203, but also a light source can be set on an upper surface of the first stamping die 203. In addition, since the first stamping die 203 is transparent, light can enter into the first stamping die 203 and penetrate the sidewall of a groove of the first stamping die 203, such that the first polymer monomer 101 in a groove is subjected to a curing treatment. It increases the contact area between the first polymer monomer 101 in the groove and the UV light, reduces UV curing time, and increases productivity.

S304: The first stamping die 203 was separated from the first polymer monomer 101 subjected to exposure and the base substrate 01 to form a pattern of the first protrusions 110 with intervals being provided between the first protrusions as shown in FIG. 4c.

S305: A mixture 100 of the second polymer monomer 102 and metal particles 103 is coated on the surface of the substrate provided with the first protrusions 110, as shown in FIG. 4d.

S306: A second stamping die 204 was stamped into the mixture 100 to contact the stamping die with the base substrate 01, such that the mixture 100 and the first protrusions 110 can be encapsulated into a groove of the second stamping die 204.

In some embodiments, a width of the groove of the second stamping die 204 can be less than or equal to 50 nm, such that a width of the formed second protrusions 111 is less than or equal to 50 nm, such that the wire grid polarizer has better polarization effect. In addition, in order to ensure that the formed second protrusions 111 can cover the first protrusions 110, a width of the groove of the first stamping die 203 should less than a width of the groove of the second stamping die 204.

Figure 7:
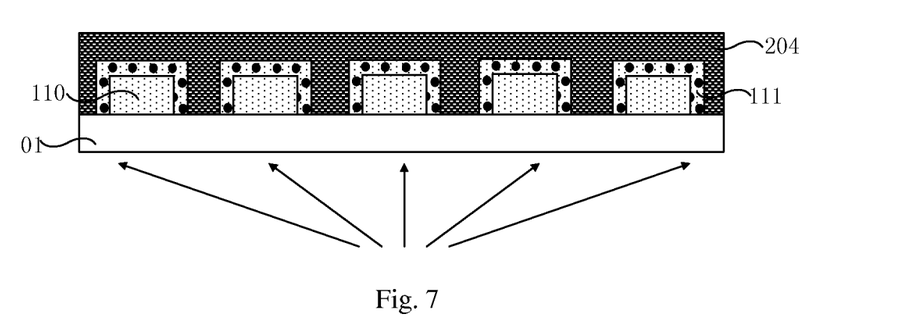
FIG. 7 is a schematic structural view of a process of another manufacturing method of a wire grid polarizer provided by an embodiment of the present invention.

S307: The mixture 100 in the second stamping die 204 was exposed. The mixture 100 in the second stamping die 204 can be exposed from the side of the base substrate 01 facing away from the second stamping die 204, as shown in FIG. 7.

In some embodiments, the second stamping die 204 is preferably formed of a transparent material, such that not only the mixture 100 in the second stamping die 204 can be exposed from the side of the base substrate 01 facing away from the second stamping die 204, but also a light source can be set on an upper surface of the second stamping die 204. In addition, because the second stamping die 204 is transparent, light can enter into the second stamping die 204 and penetrate the sidewall of a groove of the second stamping die 204, such that the mixture 100 in a groove is subjected to a curing treatment. It increases the contact area between the mixture 100 in the groove and the UV light, reduces UV curing time, and increases productivity.

S308: The second stamping die 204 was separated from the mixture 100 subjected to exposure and the base substrate 01 to form a pattern of the second protrusions 111 with intervals being provided between the second protrusions, as shown in FIG. 4f.

To sum up, in example 1, the first protrusions 110 and the second protrusions 111 were respectively formed by UV light curing with a mask plate. In example 2, the first protrusions 110 and the second protrusions 111 were respectively formed by stamping. Since the first polymer monomer 101 between two adjacent preformed first protrusions 110 (or the second polymer monomer 102 between the second protrusions 111) has been extruded out during the stamping process in example 2, the step for removing uncured first polymer monomer 101 (or second polymer monomer 102) in example 1 can be avoid. In this way, the residue of partial uncured first polymer monomer 101 (or second polymer monomer 102) being remained due to an insufficient removal during the process for removing uncured first polymer monomer 101 (or second polymer monomer 102) can be avoid. However, in example 2, the first polymer monomer 101 (or the second polymer monomer 102) being extruded out during the stamping process should be cleaned, in order to avoid contaminating the wire grid polarizer. Therefore, those skilled in the art can select a proper manufacturing method of a wire grid polarizer according to practical requirements.

In addition, in the manufacture of the pattern of wire grid, the pattern of the first protrusions 110 can be formed by UV light curing with the mask plate of the steps S201 to S203, then the pattern of the second protrusions 111 can be formed by the stamping process of the steps S305 to S308. In order to ensure that the formed second protrusions 111 can cover the first protrusions 110, a width of the groove of the second stamping die 204 in the stamping process of the steps S305 to S308 should be greater than a width of the transparent area of the first mask plate 201 in the UV light curing process with the mask plate of the steps S201 to S203.

Otherwise, the pattern of the first protrusions 110 can be formed by the stamping process of the steps S301 to S304, then the pattern of the second protrusions 111 can be formed by UV light curing with the mask plate of the steps S204 to S206. In order to ensure that the formed second protrusions 111 can cover the first protrusions 110, a width of the transparent area of the second mask plate 202 in the UV light curing process with the mask plate of the steps S204 to S206 should be greater than a width of the groove of the first stamping die 203 in the stamping process of the steps S301 to S304.

The above embodiments are only illustrative manufacturing methods of a wire grid polarizer. Other manufacturing processes are also within the protection scope of the present invention, although not described herein in detail.

In an embodiment of the present invention, there provides a wire grid polarizer, as shown in FIG. 4*f*, comprising:

a base substrate 01;

first protrusions 110 disposed on a surface of the base substrate 01 with intervals being provided between the first protrusions, the first protrusions 110 being formed of a first resin material;

second protrusions 111 disposed on the surface of the base substrate 01 with intervals being provided between the second protrusions, the second protrusions 111 being formed of a second resin material doped with metal particles 103. The second protrusions form a pattern of wire grid.

In some embodiments, each of the second protrusions 111 covers at least one surface for polarization E of the first protrusions 110. In some embodiments, each of the second protrusions 111 covers at least one surface for polarization E of one first protrusion 110. As shown in FIG. 4*g*, the surface for polarization E can be either an upper surface E1 or a side surface E2 of the first protrusions 110, and the side surface E2 is parallel to an arrangement direction X of the wire grid.

It should be noted that: firstly, the first resin material or the second resin material may comprise an acrylic polymer. The acrylic polymer can be formed by polymerization of an acrylic monomer. The acrylic monomer can be at least one selected from the group consisting of methyl acrylate, ethyl acrylate, n-butyl acrylate, methyl methacrylate and n-butyl methacrylate.

Secondly, the metal particles 103 mean metal particles of nanometer size, and can be formed of one or more selected from the group consisting of elementary substance iron, elementary substance copper and elementary substance aluminum. Metal aluminum contains more free electrons because it has greater conductivity. Whereas, the polarization of an incident light by a wire grid polarizer in the present invention is just achieved by use of oscillation properties of free electrons in a metal. Therefore, a preferred metal particles 103 in an embodiment of the present invention are aluminum particles or aluminum alloy particles.

An embodiment of the present invention provides a wire grid polarizer, comprising: a base substrate; first protrusions disposed on a surface of the base substrate with intervals being provided between the first protrusions, the first protrusions being formed of a first resin material; and second protrusions disposed on the surface of the base substrate with intervals being provided between the second protrusions, the second protrusions being formed of a second resin material doped with metal particles. In some embodiments, each of the second protrusions covers at least one surface for polarization of the first protrusions. In some embodiments, each of the second protrusions covers at least one surface for polarization of one first protrusion. Under the circumstances, in one aspect, due to the metal particles in the second protrusions, an incident light can be polarized by virtue of oscillation properties of free electrons in the metal particles, such that a wire grid polarizer with reflection properties can be formed. In another aspect, since the first polymer monomer and the second polymer monomer are generally resin materials, the consumption of metal materials can be reduced in the manufacturing of the wire grid polarizer, and the production cost can be reduced because the cost of a resin material is relatively low in comparison with a metal target material.

The present invention provides a display device, comprising any one of above wire grid polarizers, and achieving the same advantage effects as described for the wire grid polarizers in the above embodiments. The structure, manufacturing method and advantage effects of the wire grid polarizer has been described in detail in the above embodiments, and thus will not need to be described herein.

It should be noted that, in an embodiment of the present invention, a display device can at least specifically comprises a liquid crystal display device and an organic light-emitting diode display device. For example, such a display device can be any product or part having a display function, such as a liquid crystal display, a liquid crystal TV, a digital photo frame, a cell phone or a tablet, etc.

The present invention comprises the following embodiments.

Embodiment 1

A wire grid polarizer, comprising:
a base substrate;

first protrusions disposed on a surface of the base substrate with intervals being provided between the first protrusions, the first protrusions being formed of a first resin material; and second protrusions disposed on the surface of the base substrate with intervals being provided between the second protrusions, the second protrusions being formed of a second resin material doped with metal particles and forming a pattern of wire grid;

wherein each of the second protrusions covers at least one surface for polarization of the first protrusions, and the surface for polarization is at least one of an upper surface and a side surface of the first protrusions, and the side surface is parallel to an arrangement direction of the wire grid.

Embodiment 2

The wire grid polarizer according to embodiment 1, wherein the first resin material or the second resin material comprises an acrylic polymer; and the metal particles are formed of one or more selected from the group consisting of elementary substance iron, elementary substance copper and elementary substance aluminum.

Embodiment 3

The wire grid polarizer according to embodiment 1 or 2, wherein the second protrusions are arranged at a period of less than or equal to 100 nm.

Embodiment 4

The wire grid polarizer according to any one of embodiments 1-3, wherein each of the second protrusion s has a width of less than or equal to 50 nm.

Embodiment 5

The wire grid polarizer according to any one of embodiments 1-4, wherein a sum of a thickness of the first protrusions and a thickness of the second protrusions is 20 nm to 100 nm.

Embodiment 6

The wire grid polarizer according to any one of embodiments 1-5, wherein a material for forming the base substrate comprises at least one selected from the group consisting of glass and quartz, or at least one selected from the group consisting of polyethylene glycol terephthalate and cellulose triacetate.

Embodiment 7

The wire grid polarizer according to any one of embodiments 1-6, wherein each of the second protrusions covers at least one surface for polarization of one first protrusion.

Embodiment 8

A display device, comprising a wire grid polarizer according to any one of embodiments 1-7.

Embodiment 9

A method for manufacturing a wire grid polarizer, the wire grid polarizer comprises:

a base substrate;

first protrusions disposed on a surface of the base substrate with intervals being provided between the first protrusions, the first protrusions being formed of a first resin material; and second protrusions disposed on the surface of the base substrate with intervals being provided between the second protrusions, the second protrusions being formed of a second resin material doped with metal particles and forming a pattern of wire grid;

wherein each of the second protrusions covers at least one surface for polarization of the first protrusions, and the surface for polarization is at least one of an upper surface and a side surface of the first protrusions, and the side surface is parallel to an arrangement direction of the wire grid;

the method comprises:

coating a first polymer monomer on the surface of the base substrate;

subjecting the first polymer monomer at a position corresponding to the first protrusions to a curing treatment;

forming a pattern of the first protrusions on the surface of the base substrate with intervals being provided between the first protrusions;

coating a mixture of a second polymer monomer and metal particles on the surface of the substrate provided with the first protrusions;

subjecting the mixture at a position corresponding to the second protrusions to a curing treatment;

forming a pattern of wire grid formed of the second protrusions on the surface of the base substrate with intervals being provided between the second protrusions, so that each of the second protrusions covers at least one surface for polarization of the first protrusions.

Embodiment 10

The method for manufacturing the wire grid polarizer according to embodiment 9, wherein forming of the first protrusions after coating the first polymer monomer on the surface of the base substrate comprises:

disposing a first mask plate on a surface of the first polymer monomer, and exposing a position of the first polymer monomer corresponding to a transparent area of the first mask plate;

removing the first polymer monomer corresponding to a shielding area of the first mask plate.

Embodiment 11

The method for manufacturing the wire grid polarizer according to embodiment 9, wherein forming of the first protrusions after coating the first polymer monomer on the surface of the base substrate comprises:

stamping a first stamping die into the first polymer monomer to contact the stamping die with the base substrate;

exposing the first polymer monomer in the first stamping die;

separating the first stamping die from the first polymer monomer subjected to exposure and the base substrate.

Embodiment 12

The method for manufacturing the wire grid polarizer according to embodiment 10 or 11, wherein forming of the second protrusions after coating the mixture of the second polymer monomer and metal particles on the surface of the substrate provided with the first protrusions comprises:

disposing a second mask plate on a surface of the mixture, and exposing a position of the mixture corresponding to a transparent area of the second mask plate; wherein a width of the transparent area of the second mask plate is greater than a width of the transparent area of the first mask plate; or the width of the transparent area of the second mask plate is greater than a width of the groove of the first stamping die;

removing the mixture corresponding to a shielding area of the second mask plate.

Embodiment 13

The method for manufacturing the wire grid polarizer according to embodiment 10 or 11, wherein forming of the second protrusion after coating the mixture of the second polymer monomer and metal particles on the surface of the substrate provided with the first protrusions comprises:

stamping a second stamping die into the mixture to contact the stamping die with the base substrate, wherein a width of the groove of the second stamping die is greater than a width of the transparent area of the first mask plate, or the width of the groove of the second stamping die is greater than a width of the groove of the first stamping die;

exposing the mixture in the second stamping die; and separating the second stamping die from the mixture subjected to exposure and the base substrate.

Embodiment 14

The method for manufacturing the wire grid polarizer according to embodiment 13, wherein at least one of the first stamping die and the second stamping die is formed of a transparent material.

Embodiment 15

The method for manufacturing the wire grid polarizer according to any one of embodiments 9-14, wherein a material for forming the first polymer monomer or the second polymer monomer comprises an acrylic monomer; and the metal particles are formed of one or more selected from the group consisting of elementary substance iron, elementary substance copper and elementary substance aluminum.

Embodiment 16

The method for manufacturing the wire grid polarizer according to any one of embodiments 9-15, wherein the second protrusions are arranged at a period of less than or equal to 100 nm.

Embodiment 17

The method for manufacturing the wire grid polarizer according to any one of embodiments 9-16, wherein each of the second protrusions has a width of less than or equal to 50 nm.

Embodiment 18

The method for manufacturing the wire grid polarizer according to any one of embodiments 9-17, wherein a sum of a thickness of the first polymer monomer and a thickness of the mixture is 20 nm to 100 nm.

Embodiment 19

The method for manufacturing the wire grid polarizer according to any one of embodiments 9-18, wherein a material for forming the base substrate comprises at least one selected from the group consisting of glass and quartz, or at least one selected from the group consisting of polyethylene glycol terephthalate and cellulose triacetate.

Embodiment 20

The method for manufacturing the wire grid polarizer according to any one of embodiments 9-19, wherein a sum of a thickness of the first protrusion and a thickness of the second protrusion is 20 nm to 100 nm.

Embodiment 21

The method for manufacturing the wire grid polarizer according to any one of embodiments 9-20, wherein each of the second protrusions covers at least one surface for polarization of one first protrusion.

The forgoing is only the illustrative embodiments of the present invention and not intended to limit the protection scope of the present invention. The protection scope of the present invention should be defined by the appended claims.

The present invention claims priority of the Chinese patent application No. 201410841901.3, filed on Dec. 30, 2014, the disclosure of which is incorporated herein by reference as part of the application.

What is claimed is:

1. A wire grid polarizer, comprising:
   a base substrate;
   first protrusions disposed on a surface of the base substrate with intervals being provided between the first protrusions, the first protrusions being formed of a first resin material; and
   second protrusions disposed on the surface of the base substrate with intervals being provided between the second protrusions, the second protrusions being formed of a second resin material doped with metal particles and forming a pattern of wire grid;
   wherein each second protrusion covers an upper surface and a lateral surface of one first protrusion, a bottom end of each second protrusion is in direct contact with the base substrate, and bottom ends of adjacent second protrusions are spaced from each other; and a width of a top end of each second protrusion along an arrangement direction of the second protrusions is greater than a distance normal to the base substrate from the top end of the second protrusion to the base substrate between adjacent ones of the first protrusions.

2. The wire grid polarizer according to claim 1, wherein the first resin material or the second resin material comprises an acrylic polymer; and the metal particles are formed of one or more selected from the group consisting of elementary substance iron, elementary substance copper and elementary substance aluminum.

3. The wire grid polarizer according to claim 1, wherein the second protrusions are arranged at a period of less than or equal to 100 nm.

4. The wire grid polarizer according to claim 1, wherein each of the second protrusions has a width of less than or equal to 50 nm.

5. The wire grid polarizer according to claim 1, wherein a sum of a thickness of the first protrusions and a thickness of the second protrusions is 20 nm to 100 nm.

6. The wire grid polarizer according to claim 1, wherein a material for forming the base substrate comprises at least one selected from the group consisting of glass and quartz, or at least one selected from the group consisting of polyethylene glycol terephthalate and cellulose triacetate.

7. A display device, comprising a wire grid polarizer according to claim 1.

8. A method for manufacturing a wire grid polarizer, wherein
the method comprises:
coating a layer of a first polymer monomer on a surface of a base substrate;
subjecting the layer of the first polymer monomer at a position corresponding to first protrusions to a curing treatment;
forming a pattern of the first protrusions on the surface of the base substrate with intervals being provided between the first protrusions;
coating a layer of a mixture of a second polymer monomer and metal particles on the surface of the substrate provided with the first protrusions;
subjecting the mixture at a position corresponding to second protrusions to a curing treatment; and
forming a pattern of wire grid formed of the second protrusions on the surface of the base substrate with intervals being provided between the second protrusions, so that each second protrusion covers an upper surface and a lateral surface of one first protrusion, a bottom end of each second protrusion is in direct contact with the base substrate, and bottom ends of adjacent second protrusions are spaced from each other; and a width of a top end of each second protrusion along an arrangement direction of the second protrusions is greater than a distance normal to the base substrate from the top end of the second protrusion to the base substrate between adjacent ones of the first protrusions.

9. The method for manufacturing the wire grid polarizer according to claim 8, wherein forming of the first protrusions after coating the layer of the first polymer monomer on the surface of the base substrate comprises:
disposing a first mask plate on a surface of the layer of the first polymer monomer, and exposing a position of the layer of the first polymer monomer corresponding to a transparent area of the first mask plate; and
removing the layer of the first polymer monomer corresponding to a shielding area of the first mask plate.

10. The method for manufacturing the wire grid polarizer according to claim 8, wherein forming of the first protrusions after coating the layer of the first polymer monomer on the surface of the base substrate comprises:
stamping a first stamping die into the layer of the first polymer monomer to contact the stamping die with the base substrate;
exposing the first polymer monomer in the first stamping die; and
separating the first stamping die from the first polymer monomer subjected to exposure and the base substrate.

11. The method for manufacturing the wire grid polarizer according to claim 9, wherein forming the second protrusions after coating the layer of the mixture of the second polymer monomer and metal particles on the surface of the substrate provided with the first protrusions comprises:
disposing a second mask plate on a surface of the mixture, and exposing a position of the mixture corresponding to a transparent area of the second mask plate; wherein a width of the transparent area of the second mask plate is greater than a width of the transparent area of the first mask plate; or the width of the transparent area of the second mask plate is greater than a width of the groove of the first stamping die; and
removing the mixture corresponding to a shielding area of the second mask plate.

12. The method for manufacturing the wire grid polarizer according to claim 9, wherein forming of the second protrusion after coating the layer of the mixture of the second polymer monomer and metal particles on the surface of the substrate provided with the first protrusions comprises:
stamping a second stamping die into the layer of the mixture to contact the stamping die with the base substrate, wherein a width of the groove of the second stamping die is greater than a width of the transparent area of the first mask plate, or the width of the groove of the second stamping die is greater than a width of the groove of the first stamping die;
exposing the mixture in the second stamping die; and
separating the second stamping die from the mixture subjected to exposure and the base substrate.

13. The method for manufacturing the wire grid polarizer according to claim 12, wherein at least one of the first stamping die and the second stamping die is formed of a transparent material.

14. The method for manufacturing the wire grid polarizer according to claim 8, wherein a material for forming the first polymer monomer or the second polymer monomer comprises an acrylic monomer; and the metal particles are formed of one or more selected from the group consisting of elementary substance iron, elementary substance copper and elementary substance aluminum.

15. The method for manufacturing the wire grid polarizer according to claim 8, wherein
the second protrusions are arranged at a period of less than or equal to 100 nm.

16. The method for manufacturing the wire grid polarizer according to claim 8, wherein
each of the second protrusions has a width of less than or equal to 50 nm.

17. The method for manufacturing the wire grid polarizer according to claim 8, wherein
a sum of a thickness of the layer of the first polymer monomer and a thickness of the layer of the mixture is 20 nm-100 nm.

18. The method for manufacturing the wire grid polarizer according to claim 8, wherein
a material for forming the base substrate comprises at least one selected from the group consisting of glass and quartz, or at least one selected from the group consisting of polyethylene glycol terephthalate and cellulose triacetate.

19. The method for manufacturing the wire grid polarizer according to claim 8, wherein
a sum of a thickness of the first protrusion and a thickness of the second protrusion is 20 nm to 100 nm.

20. A wire grid polarizer, comprising:
a base substrate;
first protrusions disposed on a surface of the base substrate with intervals being provided between the first protrusions, the first protrusions being formed of a first resin material; and second protrusions disposed on the surface of the base substrate with intervals being provided between the second protrusions, the second protrusions being formed of a second resin material doped with metal particles and forming a pattern of wire grid;

wherein each of the second protrusions covers at least one surface for polarization of the first protrusions, bottom ends of outer lateral walls of adjacent second protrusions contact the base substrate directly and are spaced from each other, and a height of an outer lateral wall of each second protrusion is greater than a height of an outer lateral wall of each first protrusion; and a width of a top end of each second protrusion along an arrangement direction of the second protrusions is greater than a distance normal to the base substrate from the top end of the second protrusion to the base substrate between adjacent ones of the first protrusions.

* * * * *